Dec. 18, 1928.
N. R. BROWNYER
CAR WHEEL
Filed Aug. 8, 1927
1,695,529
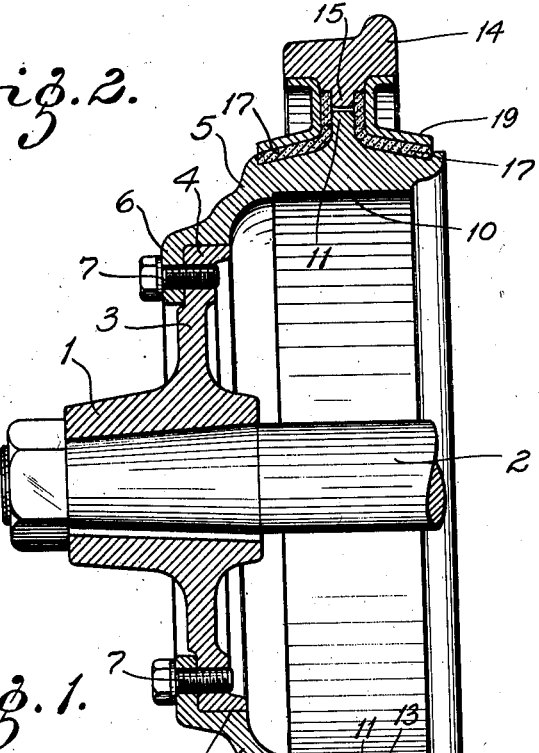
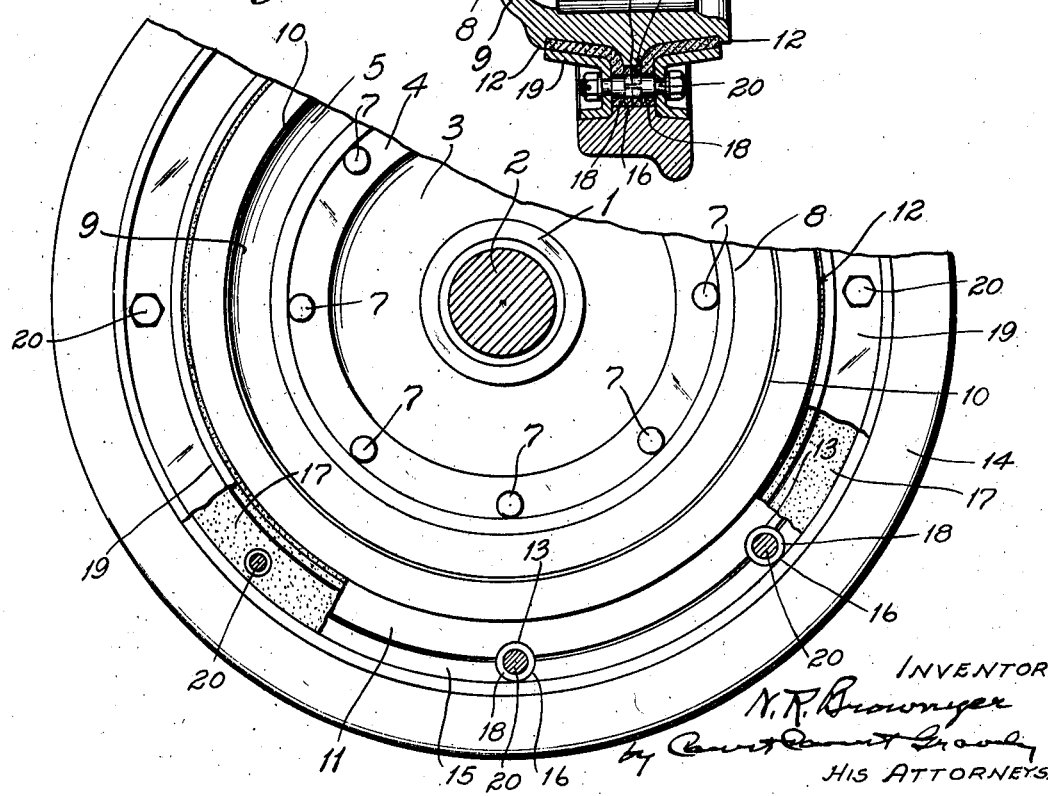
INVENTOR
N. R. Brownyer
HIS ATTORNEYS.

Patented Dec. 18, 1928.

1,695,529

UNITED STATES PATENT OFFICE.

NELSON R. BROWNYER, OF DETROIT, MICHIGAN, ASSIGNOR TO THE TIMKEN-DETROIT AXLE COMPANY, OF DETROIT, MICHIGAN, A CORPORATION OF MICHIGAN.

CAR WHEEL.

Application filed August 8, 1927. Serial No. 211,332.

This invention relates to car wheels, especially such as are used with street cars. Its principal objects are to adapt it for use with an internal expanding brake, to make provision for deadening noise and vibration, and to obtain other advantages hereinafter appearing. It consists in the parts and combinations and arrangements of parts hereinafter described and claimed.

In the accompanying drawing wherein like numerals refer to like parts wherever they occur, Fig. 1 is a face view of my wheel; and Fig. 2 is a longitudinal sectional view of a part of the wheel.

My wheel comprises a hub portion 1, which is shown with a central bore suitable for mounting on an axle 2. Extending outwardly from this hub and preferably integral therewith is a wide annular rib or web 3 with a cylindrical periphery. The peripheral portion of this rib is widened by means of an annular flange 4 on the inner face thereof so as to increase the bearing surface of said periphery. The marginal portion of the outer face of the rib or web is offset inwardly with respect to the plane of said outer face, so as to afford a seat or bearing for a member 5 hereinafter designated as the brake drum member.

The outer end portion of this brake drum member which is also its portion of least diameter, is in the form of an annular flange 6 that fits flatwise against the face of said hub rib in the seat provided therefor and which is integral with a hollow cylindrical portion of such diameter as to fit over the peripheral bearing surface of said hub rib 3. Said end flange 4 of this brake drum member, which is disposed radially, is clamped flatwise against said hub rib 3 by screws 7 or other fastening devices that extend through them.

From the radially inner angular portion 8 of the brake drum member, being the longitudinally outer end portion thereof, an annular web portion 9 extends obliquely outwardly with relation to the axis of the hub and inwardly with respect to the longitudinal center line of the car. This obliquely disposed web portion 9 terminates in a brake drum 10 whose inner surface is of cylindrical form and adapted for cooperation with the friction member or members of an internal or expanding brake of any suitable type, such for instance, as an expanding band. The outer surface of this cylindrical drum is formed with an annular rib 11 about midway of its length, the thickness of said rib increasing gradually from its outer periphery until it meets the outer surface of the body portion of said drum. This outer surface of the drum tapers from said rib towards both ends thereof, where said drum is provided with ribs or shoulders 12. At intervals around its circumstance the rib of the brake drum member is provided with semi-circular notches 13.

The rim portion 14 of the wheel is mounted on the brake drum member. This rim portion, which is made with an ordinary conical tread and rail flange, has an inwardly extending annular rib 15 located substantially midway thereof. This annular rib extends inwardly to a point where its inner diameter is only slightly greater than the outer diameter of the rib on the brake drum member; and the inner rib 15 of said rim member is provided with semi-circular notches 16 of proper size and properly positioned to match the semi-circular notches 13 in the rib 11 of the brake drum member.

Surrounding the brake drum member are two series of insulating members 17, preferably rubber, which are shaped to fit against the outer surface of the brake drum member and the shoulders 12 thereof and also against the sides of the rib 11 thereof, and at the same time fit against the sides of the rib 15 of the rim member and against the inner cylindrical surface of said rim member. The insulation members are provided with perforated lateral bosses 18 which fit the semi-circular notches 13 and 16 provided therefor in the ribs of the brake drum member and of the rim member respectively. Rings 19 of angular or channel section alongside of said insulation members serve as clamping members. The inner flange of these rings is inclined conformably to the inclination of the outer surface of the brake drum member, (or rather conformably to the insulation members that rests on said surface) and the outer flange of said rings is inclined conformably to the inclined inner surface of said rim member, while the web or middle member of such rings bears flatwise against the radial portions of the insulating members. Clamping bolts 20 extend through holes provided therefor in said clamping rings and through the insulation members and their perforated bosses and are provided with suitable washers and locking devices. The central portion of the bolts being the portion which is in contact with the insulating material, is preferably larger than the outer portions of the bolt that are in contact with the clamping plates.

The construction thus described is made up of parts that are easy and inexpensive to manufacture and as the rim portion is entirely insulated from the inner portions of the wheel, vibrations and noises are very much deadened. The construction makes it feasible to use an internal expanding brake and especially makes it feasible to locate the brake on the inner side of the wheel, whereby it becomes feasible to obtain divers advantages in the utilization of the space available for parts that are assembled with the wheel.

What I claim is:

1. A car wheel comprising a hub portion, a web portion and a rim portion, said web portion having on its inner side a brake drum whose inner surface is adapted for cooperation with a brake member and whose outer surface has a circumferential rib at the middle part thereof and thence tapers towards each end, said rim portion having an internal annular rib, and means engaging said rib to mount said rim on said drum.

2. A car wheel comprising a hub portion, a web portion and a rim portion, said web portion having on its inner side a brake drum whose inner surface is adapted for cooperation with a friction member and whose outer surface has a circumferential rib, the rim portion having an annular rib in the plane of said drum rib but slightly spaced therefrom, clamping rings that overlap said rings on both sides thereof, rubber or like material interposed between said ribs and said rings, and bolts for clamping said rings together, said ribs having mating notches in their edges for said bolts.

3. A car wheel comprising a hub portion, a web portion and a rim portion, said web portion having on its inner side a brake drum whose inner surface is adapted for cooperation with a friction member and whose outer surface has a circumferential rib at the middle part thereof and thence tapers towards each end, a rim portion having an interior annular rib in the plane of said drum rib, clamping rings that overlap said ribs on both sides thereof, insulating members interposed between said rings and said ribs, and bolts for clamping said rings together, said rings being of such cross-sectional shape as to press said insulation against said ribs and also against said drum and said rim, and said ribs having mating notches to accommodate said bolts.

4. A car wheel comprising a hub portion, a web portion and a rim portion, said web portion having on its inner side a brake drum whose inner surface is adapted for cooperation with a friction member and whose outer surface has a circumferential rib at the middle part thereof and thence tapers towards each end, a rim portion having an interior annular rib in the plane of said drum rib, clamping rings that overlap said ribs on both sides thereof, insulating members interposed between said rings and said ribs and provided with perforated lateral bosses, bolts extending through said bosses for clamping said rings together, said rings being of such cross-sectional shape as to press said insulation against said ribs and also against said drum and said rim, and said ribs having mating notches to accommodate said bosses.

5. A car wheel comprising a hub member having a radially disposed web, an annular member having its outer end mounted on said web with its inner end extending inwardly and having the inner surface of such extending portion concentric with the axis of the wheel to constitute a brake drum, and a rim member offset inwardly with relation to said web and mounted on the exterior of such brake drum.

6. A car wheel comprising a hub portion, a web portion and a rim portion, said web portion having an annular extension on the inner side thereof whose inner surface is concentric with the axis of the wheel and constitutes a brake drum, and said rim portion being mounted on the outer surface of said brake drum.

7. A car wheel comprising an elongated hub portion, a web portion and a rim portion, said web portion having an annular extension on its inner side with the inner surface of such extension concentric with the axis of the wheel and constituting a brake drum, and said rim portion being mounted on the exterior of said annular extension whereby said web portion is offset outwardly longitudinally of the axis of the wheel with relation to said rim portion.

Signed at St. Louis, Missouri, this 3rd day of August, 1927.

NELSON R. BROWNYER.